Patented July 19, 1932

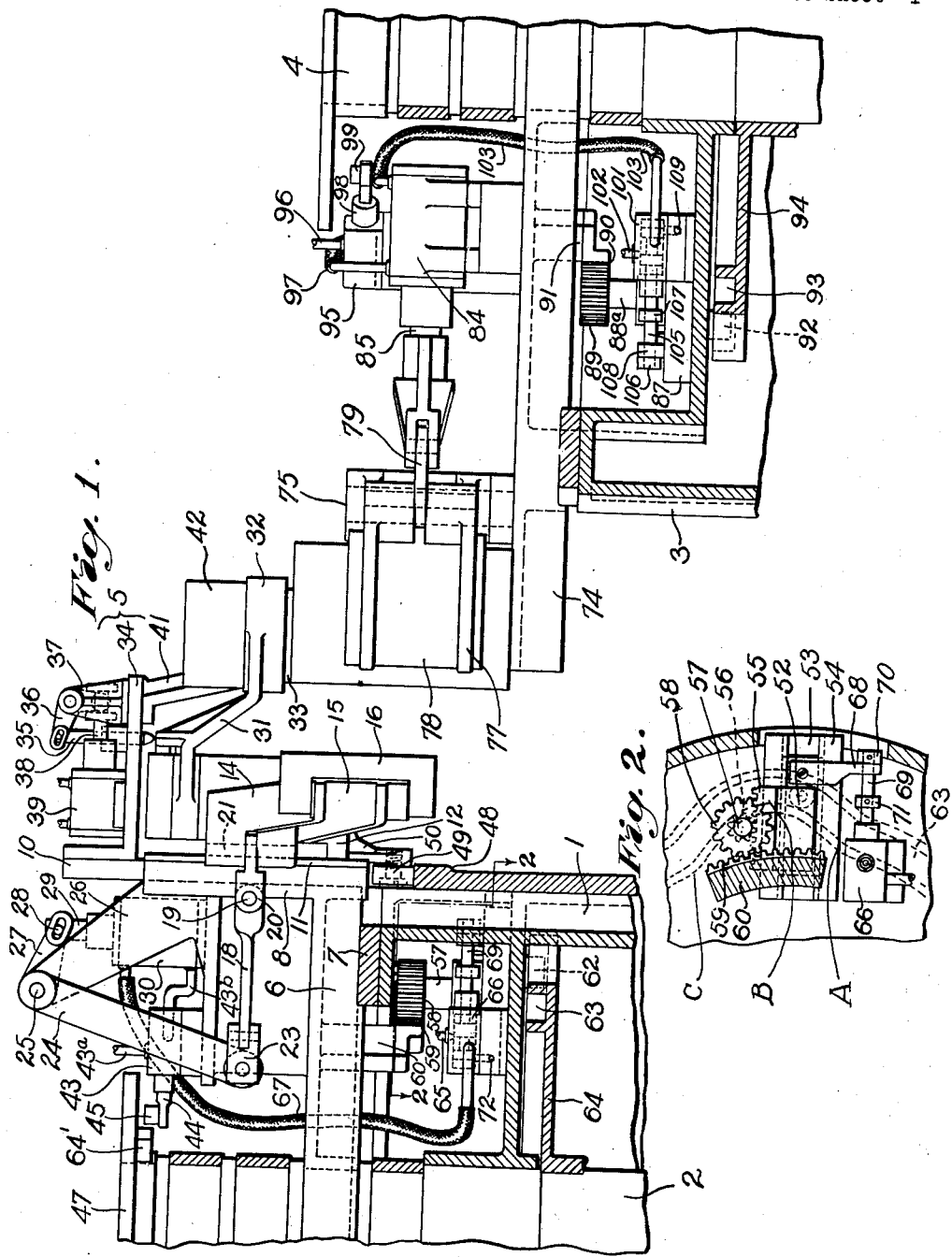

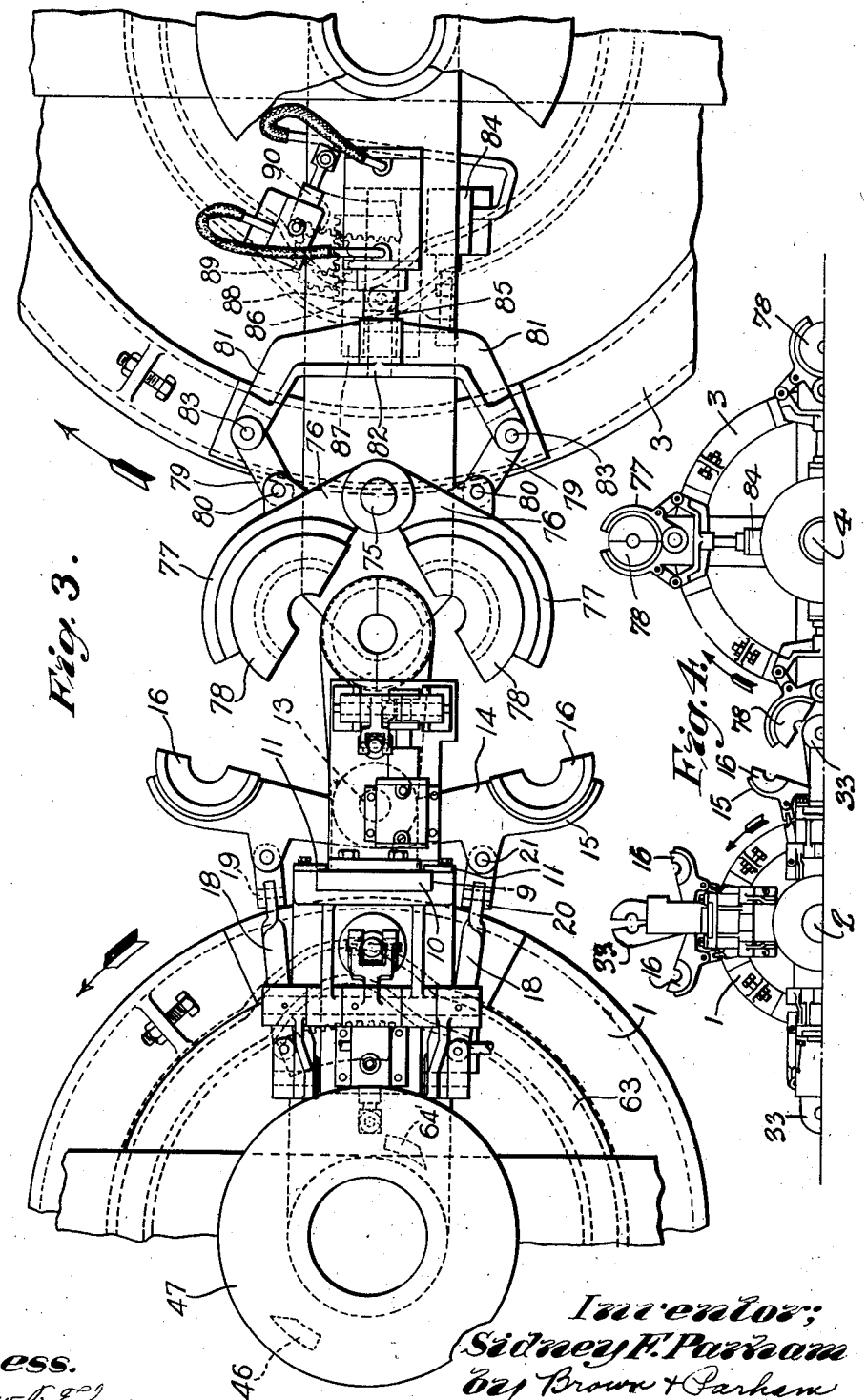

1,868,248

UNITED STATES PATENT OFFICE

SIDNEY F. PARHAM, OF WEST HARTFORD, CONNECTICUT, ASSIGNOR TO HARTFORD-EMPIRE COMPANY, OF HARTFORD, CONNECTICUT, A CORPORATION OF DELAWARE

CONTINUOUS TWO-TABLE FORMING MACHINE

Application filed May 16, 1929. Serial No. 363,523.

My invention relates to apparatus for manufacturing hollow glassware. More particularly, my invention relates to apparatus for, and methods of, forming glassware whereby the glass for each article is given a preliminary shape in a preliminary mold and then is transferred to a finishing mold in which the formation thereof is completed.

It has been the practice in the manufacture of bottles, and the like, to employ a plurality of parison molds in which the glass for the article to be made is given preliminary shape by pressing or blowing. It also has been customary to provide neck molds or neck rings arranged respectively to be associated first with the parison mold for imparting to the parison the top or neck finish of the desired shape and size. Subsequent to the formation of a parison, the parison mold usually is opened, leaving the parison suspended from the neck mold, whereupon one of a plurality of blow molds, which previously has been opened, closes about the parison, and the neck mold is opened, releasing the parison. The parison then is blown to final form in the blow mold.

The plurality of parison molds and the neck molds associated therewith may be carried by one table, while the blow molds may be carried by another table, the two tables being arranged to rotate about vertical axes in opposite directions. Thus, the parison molds and the blow molds are caused to rotate about different axes in paths which may be tangent to each other, or which may approach tangential relation, at a point at which the aforesaid transfer of a parison or blank to a blow mold is effected.

The desirability from a practical standpoint of operating a forming machine of this general character continuously (as distinguished from intermittent operation) will be obvious. Such operation would result in increased production of glassware and a more efficient performance generally of the machine.

Heretofore, continuously rotating machines have been provided; but usually in these machines, the parison molds and the neck molds associated therewith, and also the blow molds, have been mounted on a single table revolving about a single axis. One of the reasons that continuously operating two-table glassware forming machines have not been generally used heretofore is that difficulties have been experienced in effecting the transfer of the parison from the parison mold to the blow mold.

In the co-pending applications of Karl E. Peiler, Serial No. 87,800, filed February 12, 1926, Serial No. 323,954, filed December 5, 1928, and Serial No. 323,955, filed December 5, 1928, novel apparatus and methods have been disclosed and claimed by the provision of which the above mentioned difficulties are overcome and the use of continuously rotating two-table forming machines is made feasible and practical. The present invention is similar to the inventions of the aforesaid applications in that the use of a continuously operating two-table forming machine is contemplated, which machine embodies means of novel character, whereby parisons are transferred from the parison molds on one table to blow molds on the other table.

Therefore, it is an object of the present invention to provide a novel machine of the continuously rotating two-table type which operates efficiently for accomplishing the transfer of a parison or blank from a parison mold to a blow mold.

Another object of my invention is to provide a continuously rotating forming machine in which the rotation of each of the neck molds, associated with the parison molds, is stopped or retarded at the proper time to accomplish the transfer of a previously formed parison or blank to a cooperating blow mold.

A further object of my invention is to provide a novel continuously rotating forming machine wherein the rotation of each of the blow molds is stopped or retarded during the transfer of a parison or blank thereto.

It also is an object of the present invention to provide a novel apparatus wherein the paths of travel of the neck molds on a continuous parison mold table, and of the cooperating blow molds on a continuous eccentric blow mold table are such that each neck mold moves into alignment with a blow mold in a transfer zone, whereupon appropriate mechanism may operate to cause a dwell in the movements of the aligned molds for the purpose of transferring a parison, while the tables continue to rotate.

A still further object of my invention is to provide a novel continuously rotating two-table forming machine in which the rotations of the parison molds and the cooperating blow molds are stopped, for holding the said molds in alignment to permit the transfer of the parison or blank to the blow mold, the rotation of the parison and blow molds respectively being resumed subsequent to the transfer operation.

Another object of the present invention is to provide a novel apparatus whereby the transfer of a parison in a continuously rotating two-table forming machine is, or may be, effected by bringing the neck molds associated with the parison molds successively into alignment with the cooperating blow molds, and holding said molds stationary relative to their respective tables while in alignment to permit the parison or blank to be transferred to the blow mold by the neck molds. After the transfer of a parison has been accomplished, the travel of the molds may be accelerated to return each mold to its normal place on its table and to thereafter resume its normal rotation with the table.

More specifically, it is an object of my invention to provide a novel glassware forming machine characterized by the provision of two continuously driven tables on one of which tables is mounted one or more suction gathering parison forming molds and on the other of which is mounted one or more blow molds, the paths of travel of the cooperating parison and blow molds being coincident at a transfer point, and the parison and blow molds being respectively adapted to dwell at such transfer point to permit the transfer of a parison or blank from the parison mold to the blow mold.

To these and other ends, my invention comprises a construction such as set forth by way of example in the following description; pointed out particularly in the claims, and illustrated in the accompanying drawings, wherein:

Figure 1 is a view in vertical sectional elevation, showing a fragmentary portion of a continuously rotating two-table forming machine embodying my invention, and showing the various parts of the machine in the positions which they assume at the time that a parison is about to be transferred from the parison mold to the blow mold;

Fig. 2 is a view in horizontal sectional top plan of a fragmentary portion of the parison mold table, the said view being taken on the line 2—2 of Fig. 1;

Fig. 3 is a view in top plan of the construction shown in Fig. 1; and,

Fig. 4 is a view on reduced scale of one-half of a multiple mold unit two-table forming machine embodying the invention illustrated in Figs. 1 to 3.

In accordance with the principle of my invention, I provide a parison mold table and a blow mold table in adjoining relation to each other, and provided with means for rotating the said tables continuously in opposite directions in synchronism with each other. The parison mold units which are carried by the parison mold table may be identical in construction and may correspond in number and in their arrangement on the parison mold table, to the number and arrangement of the blow molds on the blow mold table. The blow molds also may be identical in construction. Each of the glass receiving and parison forming units may comprise a divided body mold and a divided neck mold which are opened and closed at appropriate times. The blow molds also may be divided, and opened and closed by the operation of suitable mechanism at the proper times.

The parison forming mold may be charged by the well-known suction method, the parison body mold, neck mold, and the suction head being supported for vertical movement so that the unit may be lowered at the proper time in the cycle of rotation of the supporting table into suction gathering position above a gathering pool, suction thereupon being applied from the head to the cavities of the closed neck and body mold to draw a charge of glass thereinto. The unit may then be raised from the glass and the glass severed from the charge in known manner. The continuous rotation of the parison mold table causes the newly formed parison or blank to be carried by the parison forming unit away from the gathering pool and toward the transfer station at the same time that the co-operating blow mold approaches the transfer station, as a result of the synchronized rotations of the parison mold and blow mold table. The parison mold unit and the blow mold unit may be mounted for rotary movement relative to their respective tables about the axes of said tables in paths which are coincident at the transfer point. Suitable mechanism is provided whereby, as the successive cooperating units approach the transfer point, they may be rotated in opposite directions and at approximately the same speed as their respective tables. Consequently, the movements of the cooperating parison and blow molds are retarded, and then prevented altogether for a brief period of time, to cause dwells thereof at the transfer point. Before the parison mold unit reaches the transfer point, the parison body mold may be opened leaving the parison suspended from the neck ring, and as the parison reaches the transfer point, the previously opened blow mold may be closed about the parison at a time when the neck ring and blow molds are brought into alignment and are held stationary. The dwells in the movements of the parison and blow molds at the transfer point insures that the parison may be transferred to the blow mold without being deformed. After the blow mold has closed about the parison, the neck ring may be opened and the parison mold unit and the blow molds respectively may be caused to accelerate and resume their travel with their respective tables. The parison mold eventually is closed and the parison is blown to final shape in the blow mold. The cycle of operation is then repeated.

Referring in detail to the drawings:

The numeral 1 designates a parison mold table arranged to rotate about the axis of a column 2, and the numeral 3 indicates a blow mold table which is arranged to rotate about the axis of a column 4. These tables are continuously rotated in synchronism by suitable means (not shown) to cause each parison mold and its cooperating blow mold to reach the point of transfer or transfer zone simultaneously and at the proper time in the cycle of rotation of the machine.

The parison forming units and the blow mold units respectively may be identical in construction and illustration and description of one of them will suffice for all.

The glass receiving and parison forming unit designated generally at 5 is mounted upon a radially extending carriage 6 rotatably mounted on the column 2, and provided with a bearing plate 7 which has sliding engagement with the top of the table 1. This arrangement of the carriage 6 permits the parison forming unit 5 and the table 1 to be moved horizontally relatively to each other in a manner and for a purpose to be described hereinafter.

The outer end portion of the carriage 6 comprises an upstanding supporting member 8, having an outwardly facing channel 9 (Fig. 3) formed therein which constitutes a vertical guide-way for a vertically slidable plate 10 which is held in the said guide-way by retainer strips 11. The slide plate 10 carries a bracket 12 near its lower end on which is mounted a vertical pivot element 13 (Fig. 3) on which the arms 14 of the holders 15 for the half-sections 16 of the parison body mold, are pivotally mounted.

Mechanism is provided for opening and closing the body mold at appropriate times. This mechanism comprises links 18, each of which is pivotally connected at its outer end by a transverse pivot member 19 to a clevis 20. Each clevis, in turn, is pivotally connected to one of the arms 14 of holders 15 by a vertical shaft or pivot element 21 which extends through spaced lugs formed on said arm, as shown. The clevises 20 constitute universal joints between the outer ends of the links 18 and their respective arms 14. The inner ends of the links 18 are connected by similar clevises 23 to the downwardly extending crank arms 24 which are mounted on and secured to the outer ends of a transverse shaft 25 suitably journaled in brackets 26 provided on the carriage 6. Rigidly secured to the middle of shaft 25 is a bifurcated arm 27, the adjoining ends of which are slotted as shown in Fig. 1, and are connected by a pin 28 extending through the slots to an upstanding rod 29 of a piston contained in a cylinder 30. This cylinder is supported by the carriage 6, and is located between the brackets 26. It will be observed that the admission of fluid pressure to and the exhaust from, opposite ends of the cylinder 30 alternately will cause reciprocation of the piston in the said cylinder which will result in the opening and closing of the body mold. It also will be seen that the opening and closing of the mold may be accomplished irrespective of its vertical position because of the universal linkage between arms 24 and the mold supports.

Mounted on the upstanding pivot element 13, previously referred to, are the arms 31 of the holders 32 for the sections 33 of the neck ring, or mold. The neck ring, or mold, is opened and closed by mechanism carried by an outwardly extending bracket 34 provided on plate member 10. This mechanism comprises a pin 35, the lower end of which is tapered for enabling the said pin to cooperate with lugs on the arm 31 to part the sections of the neck mold by a wedging action. The neck mold may be held closed by a spring (not shown) in known manner. The pin 35 is pivotally connected at its upper end to a bell-crank lever 36, pivotally supported in a bracket 37, and connected to the rod 38 of a piston contained in a cylinder 39 carried by the bracket 34. Suitable means (not shown) is provided for controlling the supply and exhaust of fluid pressure to and from the opposite end of the cylinder 39 to open and close the neck ring at appropriate times.

Connected to the outer end of the bracket 34 is a downwardly extending arm 41 which carries a head 42 which has fluid-tight engagement with the neck mold and body mold when the said molds are closed. Suction may be applied through this head to the body and neck molds when the parison forming unit is moved into position to gather a charge of glass from a pool; and if desired, pressure also may be supplied through the head 42 to assist in the shaping of the parison.

In each cycle of rotation of the parison mold table, the glass receiving and parison forming unit will be dipped into a suitable gathering pool (not shown). Prior to the time that the unit reaches a position over the gathering pool, the neck mold will be closed by the operation of the piston and cylinder 39, to raise the pin 35. The parison body mold also will be closed at this time by the admission of fluid pressure into the space in the lower end of the cylinder 30 and the exhaust of fluid pressure from the space in the upper end of said cylinder. Supply and exhaust of fluid pressure to the bottom of cylinder 30 is controlled by means of a two-way slide valve 43 carried by the carriage 6, as shown. Fluid pressure from a suitable source (not shown) may be conducted through a conduit 43a to the valve 43 and thence through a conduit 43b to the space in the lower end of the cylinder 30. Communication between the conduits 43a and 43b is controlled by a slide valve member, the stem 44 of which projects from the inner end of the valve 43, and carries a cam roller 45 adapted to cooperate with a cam 46 (Fig. 3) supported on the underside of a plate 47 carried by the column 2. As the table 1 rotates to carry the parison forming unit toward the gathering pool, the cam 46 acts on cam roller 45 to move the slide valve member to the left, looking at Fig. 1. Fluid pressure is thereupon admitted to the lower end of cylinder 30 and the parison body mold closed.

The dipping of the mold unit into the glass of the gathering pool and the adjustment of the said unit to different levels is accomplished by causing the said unit to reciprocate vertically in the guideway 9 formed in the upstanding portion 8 of the carriage 6. Such reciprocation of the unit is effected by means of a stationary cam 48 of suitable contour which surrounds the periphery of the table 1. This cam as engaged by a cam roller 49 carried by an inwardly projecting stud mounted in a downwardly extending bracket 50, formed on the lower portion of the vertically slidable plate 10 (Fig. 1). As the table 1 is rotated, the cam roller rides upon the cam and causes the glass receiving and parison forming unit to be raised and lowered at appropriate times to the desired level, or levels.

After a charge of glass has been gathered by the parison forming unit, the rotation of the table 1 carries the said unit toward the transfer point or zone. As previously stated, the machine embodies mechanism for causing the unit to be retarded in its rotation about the axis of the column 2 and to dwell at the transfer point to permit the parison or blank to be transferred to the blow mold. Said mechanism comprises a slide 52 (Fig. 2) mounted in a radially extending guideway 53 formed in a plate 54 secured to the table 1. Formed on one edge of the slide 52 is a rack 55 which meshes with and operates a pinion 56 secured to a vertically extending shaft 57 suitably journaled in bearings provided on the table 1. At its upper end, the shaft 57 carries a spur gear 58 which meshes with a sector gear 59 secured to a downwardly extending portion 60 of the carriage 6. Secured to the bottom side of the slide 52 is a cam roller 62 which operates in a cam path 63 formed on a stationary plate 64 carried by the column 2.

Referring to Fig. 2, it will be observed that the cam path 63 deviates from a circle radially and outwardly of the table 1. The point A in the cam path marks the beginning of the outward bend of the said cam path, and the travel of the cam roller 62 along such outward bend causes the slide 52 to be moved radially and outwardly of the table. As a result, the pinion 55, shaft 57 and gear 58 are rotated counterclockwise. The rotation of gear 58, by its engagement with the sector gear 59, causes the carriage 6 and the parison forming unit mounted thereon to be rotated horizontally relatively to the table 1 and in an opposite direction to the rotation of the said table. As the cam roller 62 is moved toward the point B of the cam path which indicates the outermost part of the cam path, the retarding movement of the carriage and the unit is accelerated and the shape of the cam path is such as to cause a dwell, or a brief period of rest, of the carriage and the parison forming unit. During this dwell or period of rest, the parison or blank may be transferred to the blow mold as will be pointed out hereinafter. As the cam roller 52 passes the point B, it is caused to move inwardly of the table by an inward bend of the cam path, until the point C in the cam path is reached. At this point, the circular movement of the cam roller is resumed. As a result of this inward movement of the cam roller, the pinion 56, shaft 57, and gear 58 are rotated in a clockwise direction thereby causing the rotation of the carriage 6 and the parison forming unit in the direction of rotation of the table 1 to be resumed and accelerated until the cam roller reaches the point C after which the carriage 6 travels with the table and at the same speed.

Just prior to the time that the parison forming unit reaches the transfer point, fluid pressure may be exhausted from the space in the lower end of cylinder 30 and admitted to the space in the upper end of said cylinder to open the parison body mold 16. The exhaust of fluid pressure from the lower end of the cylinder is effected by the movement of the slide valve member outwardly of the table. This movement is brought about by the engagement of roller 45 on the valve stem 44 with a cam 64' carried by plate 47, as shown. The means for controlling the admission of fluid pressure to the upper end of cylinder 30 is as follows: Fluid pressure is conducted from a suitable source to a conduit 65 connected to a two-way valve 66, to an outlet port of which valve is connected a flexible conduit 67, which leads to the space in the upper part of the cylinder 30. The flow of fluid pressure through the conduit 67 is permitted by the outward movement of a slidable valve member in the valve 66, such movement being effected by means of an arm 68 carried by the slide 52. This arm slidably engages the stem 69 of the valve member and outward movement of said arm causes it to engage a collar 70 fixed to the outer end of stem 69. Therefore it will be seen that when the slide 52 moves radially and outwardly of the table 1 to retard the movement of the parison forming unit, it also will serve through its outward movement of arm 68, to open the valve 66 which permits the flow of fluid pressure to the upper end of the cylinder 30 to open the parison body mold 16. When the slide 52 moves inwardly, as previously described, the arm 68 will be moved into engagement with a collar 71 on the valve stem 69 to move the valve inwardly, closing off the communication between conduits 65 and 67, and establishing communication between the conduit 67 and an exhaust port 72 formed in the valve 66. This permits fluid pressure in the upper space of the cylinder 30 to be exhausted to atmosphere to permit the piston in the cylinder 30 to be subsequently moved upwardly by the admission of fluid pressure to the lower space in the cylinder 30 to close the body mold as previously described. It now will be seen that the valve mechanism which is provided causes the opening and closing of the parison body mold in timed relation respectively to the approach thereof toward transfer and gathering position.

Mounted on the blow mold table 3 is a carriage 74, similar to the carriage 6, adapted to rotate horizontally about the axis of the column 4 in sliding engagement with the table 3. This carriage 74 has mounted thereon an upstanding pivot member 75 upon which the arms 76 of holders 77 of the blow mold sections 78 are rotatably mounted. Links 79 are pivotally connected at their outer ends, as indicated at 80, to lugs formed on the arms 76. The inner ends of these links are connected to the arms 81 of a cross-head 82 by pivot members indicated at 83. Reciprocation of the cross-head 82 causes the blow mold to be opened and closed. Such reciprocation is effected by means of a piston in a cylinder 84, the rod 85 of which is connected to the cross-head as shown. The cylinder 84 is suitably supported on the carriage 74 and suitable valve mechanism is provided for controlling the admission of fluid pressure to and the exhaust thereof from the opposite ends of the cylinder alternately as will later appear.

As previously stated, mechanism is provided for causing the blow mold to be retarded in its movement and to dwell in alignment with its associated neck mold at the time of the transfer of a parison or blank thereto. Said mechanism may be almost identical with the mechanism associated with the blank mold carriages. It comprises a slide 86, similar to slide 52, mounted in a slideway formed in the radially extending plate 87 secured to the table 3. This slide carries a rack 88, Fig. 3, which meshes with a pinion mounted on the bottom end of a vertically extending shaft 88a which carries a spur gear 89 at its upper end. This gear meshes with a sector gear 90 secured to a downwardly extending portion 91 of the carriage 74.

Mounted on the under side of the slide 86 is a cam roller 92 which follows a cam path 93 formed in a stationary plate 94 secured to the column 4. The contour of the cam path 93 is similar to that of the cam path 63 associated with the parison mold table. Consequently, the movement of the cam roller 92 along the cam path 93 will cause the movement or rotation of the blow mold to be retarded relative to that of the table 3 by the rotation of the carriage 74 and the blow mold in a direction opposite to the rotation of said table. Thus, as the rotation of the table 3 brings the blow mold to the transfer point, the rotation of the blow mold may be retarded and stopped to cause a dwell or a brief period of rest of the blow mold. Thereafter, the movement of the cam roller 92 in the cam path 93 will cause the rotation of the blow mold in the direction of the blow mold table to be resumed and accelerated until the blow mold occupies its normal position relatively to the table and to thereafter travel with the table.

As indicated hereinbefore, valve mechanism is provided for admitting and exhausting fluid pressure to and from opposite ends of cylinder 84 to open and close the blow mold. A two-way slide valve 95, similar to valve 43, controls the passage of fluid pressure to and from the space in the outer end of the cylinder. Fluid pressure from a suitable source is conducted to the valve through a conduit 96, thence through the valve through a flexible conduit 97 to the outer end of cylinder 84. Communication between these conduits is controlled by a slidable valve member, the stem 98 of which projects from the valve casing and carries at its end a cam roller 99 which engages cams (not shown) such as cams 46 and 64' on the parison mold table, at suitable times to permit fluid pressure to flow into the outer end of the cylinder to open the blow mold; or to permit the exhaust of fluid pressure from the outer end of the cylinder so that the fluid pressure admitted to the inner end thereof may be effective to close said blow mold. Thus, the operation of valve 95 will cause the blow mold to open to permit finished articles to be taken out of the mold, the said mold remaining open until it again approaches the transfer point. At this time, the valve 95 will be operated to exhaust the fluid pressure from the outer end of the cylinder 84.

To control the communication of the inner end of cylinder 84 with a source of fluid pressure, to close the blow mold about a parison or blank, or with the atmosphere to exhaust such fluid pressure from the cylinder to permit the opening of the mold, a two-way slide valve 101 is provided. This valve may be identical in construction with valve 66 on the parison mold table. Fluid pressure is conducted thereto through a conduit 102. A flexible conduit 103 leads from the valve to the inner end of cylinder 84. Communication between conduits 102 and 103 is controlled by a slidable valve member the stem 105 which projects from the valve casing and carries a couple of collars 106, 107 mounted thereon in spaced relation. An arm 108 slidably engages the stem 105 between the two collars. This arm is secured to the slide 88 and, consequently, radial movement of the slide outwardly and inwardly of the table causes the valve member to be moved outwardly and inwardly as the arm 108 alternately engages respectively the collar 106 or collar 107. Outward movement of the valve member establishes communication between conduits 102 and 103 to close the mold; whereas, inward movement thereof permits conduit 103 to communicate with the atmosphere through an exhaust port 109 formed in the casing of valve 101, so that the introduction of fluid pressure to the outer end of the cylinder through valve 95, as previously described, may be effective to open the blow mold. It will be seen that valve 101 will operate to close the blow mold about a parison at the time that the said mold arrives at the transfer point. Subsequently, the said valve will be operated by slide 86 to exhaust fluid pressure from the inner end of cylinder 84. The linkage for opening and closing the blow mold is such that when the mold is closed it will remain so after air has been exhausted from the inner end of the cylinder 84 and until pressure is applied to the outer end of the cylinder. If, however, it becomes desirable to positively hold the blow molds closed by pressure in cylinder 84 after the mold has resumed its normal travel the collars 106 and 107 may be replaced by a suitable cam roller coacting with an additional stationary cam.

Briefly stated, the operation of my novel apparatus is as follows:

After a charge of glass has been gathered by the glass receiving and parison forming unit, the said unit and the cooperating blow mold are simultaneously rotated in paths which may be coincident at the transfer point by the synchronized operation of the two tables. As the said unit nears the transfer point, the parison or blank mold is opened by the operation of valve 66, in timed relation to its arrival near such point; and, the blow mold is opened by the operation of valve 95 to receive the parison or blank carried by the neck mold. Meanwhile, the movements of the parison unit and the blow mold are retarded respectively and when the neck mold and blow mold come into alignment, the movements of the unit and blow mold are stopped to cause dwells in the rotations of the molds. Thereupon, the blow mold is caused to close about the parison and the neck mold is opened, completing the transfer. Subsequently, the inward movements of the slides 52 and 86 respectively controlled by their respective cam rollers and cams, will cause the rotations of the blank mold unit and the blow mold in the direction of rotation to be resumed and accelerated to return the unit and the blow mold to their normal stations, at which they thereafter travel with their tables. Such operations of the slides also will cause valves 66 and 101 respectively to be moved inwardly of their tables. Consequently fluid pressure will be exhausted from the upper end of cylinder 30 and from the inner end of cylinder 84 at this time as previously described. The neck mold and finally the body mold, will be closed by the operations respectively of the pin 35, and valve 43 as already explained. The previously formed blank is blown to final form in the blow mold by the engagement of a suitable blow head (not shown) with the blow mold, after which the blow mold is opened by the operation of valve 95 to permit the take out of the finished article. The blow mold may remain open until it again is carried to the transfer point.

The principles of my invention may be applied to a forming machine in which transfer tongs may be used instead of a neck ring for effecting the transfer, such tongs being carried on a retarded carriage on one of the tables while the mold unit on that table may be mounted directly on the table and the companion mold on the other table being arranged for retard and resume movements. Such a transfer is described and claimed in my co-pending application Serial No. 408,227, filed November 19, 1929.

Also my invention herein set forth may be modified to accomplish the transfer by the radial projection of a neck ring or transfer tongs while retarding without arresting the movement of the carrier and while the associated blow mold travels in a constant path at constant speed. Such an arrangement permits the neck ring or tongs to follow the path of a mold at precisely the speed of the mold and assures perfect registration during the transfer.

It also will be understood that if the transfer is effected by causing a definite stop in the rotation of the appropriate molds and transfer mechanism, it is not then essential that the tables be rotated in opposite directions.

It is to be understood that my novel transfer mechanism may be used in conjunction with machines to which glass is fed in gobs or otherwise, and that the invention is not limited to suction gathering forming machines.

Having thus described my invention, what I desire to claim and to secure by Letters Patent is:

1. In a continuously rotating glassware forming machine including a table, a blank mold mounted on said table, a blow mold, means for transferring a blank from the blank mold to the blow mold, means for causing a dwell in the rotation of said blank mold and means controlled by said last-named means for opening the blank mold.

2. In a continuously rotating glassware forming machine including a table, a blow mold mounted on said table, a blank mold, means for transferring a blank from the blank mold to the blow mold, means for causing a dwell in the rotation of said blow mold, and means controlled by said last named means for closing said blow mold.

3. In a continuously rotating two-table glassware forming machine, a blank mold mounted on one table, a blow mold mounted on the other table, means for transferring a blank from the blank mold to the blow mold, means for causing dwells in the rotations of said molds to permit the transfer of the blank by the transferring means, and means controlled by said last named means for opening and closing respectively the said blank and blow molds.

4. Apparatus for fabricating glassware comprising a continuously rotating blank mold table, a plurality of blank molds thereon, a continuously rotating blow mold table eccentric and adjacent to the blank mold table, a plurality of blow molds thereon, the rotation of said tables causing the blank molds and companion blow molds to be moved toward and away from each other in a transfer zone between the tables, means for forming blanks in the blank molds, and means for transferring a blank from a blank mold to the companion blow mold in the transfer zone including a ware holder mounted for rotation with one of said tables, means for retarding the rotation of said ware holder relative to its table and means for retarding the rotation of the appropriate mold on the other table, whereby the transfer of the blank may be accomplished without stopping the rotation of said tables and of the other molds carried thereby, and means for causing the rotation of the retarded mold to be resumed with its table.

5. Apparatus for fabricating glassware comprising a continuously rotating blank mold table, a plurality of blank molds thereon, each of said blank molds having a blank holder individual thereto and rotatable with said table, a continuously rotating blow mold table eccentric and adjacent to the blank mold table, a plurality of blow molds thereon, the rotation of said tables causing blank molds and companion blow molds to be moved toward and away from each other in a transfer zone between the tables, means for forming blanks in the blank molds, and means for transferring a blank from a blank mold to the companion blow mold in the transfer zone including means for opening the blank mold to leave a previously formed blank supported by the associated blank holder, means for retarding the rotation of the blank holder and of the companion blow mold relative to their tables whereby the transfer of the blank may be accomplished without stopping the rotation of the tables and of the other molds carried thereby, means for closing the companion blow mold about the blank, and means for causing the rotation of the blank holder and blow mold to be resumed with their tables.

6. Apparatus for fabricating glassware comprising a continuously rotating blank mold table, a plurality of blank molds thereon, a continuously rotating blow mold table eccentric and adjacent to the blank mold table, a plurality of blow molds thereon, the rotation of said tables causing companion blank molds and blow molds to be moved toward and away from each other in a transfer zone between the tables, means for forming blanks in the blank molds, and means for transferring a blank from a blank mold to the companion blow mold in the transfer zone including means for opening the blank mold, means adapted to rotate with the blank mold table for supporting a blank, previously formed in the blank mold, as the blank mold opens, means for retarding the rotation of said supporting means relative to its table, means for retarding the rotation of the companion blow mold relative to its table, whereby the transfer of the blank may be accomplished without stopping the rotation of the table and of the other molds carried thereby, means for closing the blow mold about the blank, means for releasing the blank to the blow mold, and means for causing the rotation of the retarded blow mold to be resumed with its table.

7. Apparatus for fabricating glassware comprising a continuously rotating blank mold table, a plurality of blank molds thereon, neck molds associated with the blank molds, a continuously rotating blow mold table adjacent and eccentric to the blank mold table, a plurality of blow molds thereon, the rotation of said tables causing companion blank molds and blow molds to be moved toward and away from each other in a transfer zone between the tables, means for forming blanks in the blank molds, and means for transferring a blank from a blank mold to the companion blow mold in the transfer zone including means for opening the blank mold as it moves toward the transfer zone to leave a previously formed blank supported by the neck mold, means for retarding the rotation of the neck mold and of the companion blow mold relative to their tables, whereby the transfer of the blank may be accomplished without stopping the rotation of the tables and of the other molds carried thereby, and means for causing the rotation of the retarded neck mold and blow mold to be resumed with their respective tables.

8. Apparatus for fabricating glassware comprising a continuously rotating blank mold table, a plurality of blank molds thereon, neck molds associated with the blank molds, a continuously rotating blow mold table adjacent and eccentric to the blank mold table, a plurality of blow molds thereon, the rotation of said tables causing each of the neck molds to be moved substantially into axial alignment with a companion blow mold on the blow mold table, in a transfer zone between the tables, means for forming blanks in the blank molds and neck molds, and means for transferring a blank from a blank mold to the companion blow mold in the transfer zone, including means for opening a blank mold to leave a previously formed blank suspended from the neck mold, means for retarding the rotation of the neck mold and of the companion blow mold relative to their respective tables, whereby the suspended blank is held substantially in axial alignment with the blow mold while the movements of the neck mold and blank and of the blow mold are retarded relative to their tables, means for closing the blow mold about the suspended blank, means for opening the neck mold to release the blank in the blow mold, and means for causing the rotation of the neck mold and blow mold to be resumed with their respective tables, whereby the transfer of the blank may be accomplished without stopping the rotation of the tables and of the other molds carried thereby.

9. Apparatus for fabricating glassware comprising a continuously rotating blank mold table, a plurality of blank molds thereon, neck molds associated with the blank mold, a continuously rotating blow mold table adjacent and eccentric to the blank mold table, a plurality of blow molds thereon, the rotation of said tables causing companion blank molds and blow molds to be moved toward and away from each other in a transfer zone between the tables, means for forming blanks in the blank molds, and means for transferring a blank from a blank mold to the companion blow mold in the transfer zone including means for opening a blank mold as it moves toward the transfer zone to leave the previously formed blank supported by the neck mold, means for retarding the rotation of the neck mold, blank mold and companion blow mold relative to their respective tables whereby the transfer of the blank may be accomplished without stopping the rotation of the tables and of the other molds carried thereby, and means for causing the rotation of the retarded molds to be resumed with their tables upon completion of the transfer operation.

10. In a machine for molding glass articles, the combination of a blank mold and a finishing mold, means for rotating said molds about separate vertical axes and periodically bringing the molds to a transfer station between said axes, the angular speed of rotation of each mold about its said axis being at all times equal to that of the other mold, said speed being constant during the greater part of each rotation, means for periodically accelerating the speed of the molds, means for arresting the molds at the transfer station, and means for transferring a parison from the blank mold to the finishing mold at said station.

11. In a machine for molding glass articles, the combination of a blank mold and a finishing mold, means for rotating said molds about separate vertical axes and periodically bringing the molds to a transfer station between said axes, the angular speed of rotation of each mold about its said axis being at all times equal to that of the other mold, said speed being constant during the greater part of each rotation, means for periodically accelerating the speed of the molds, means for arresting the molds at the transfer station, and means for transferring a parison from the blank mold to the finishing mold at said station, the time interval between the arrival of a mold at any point during its rotation and its arrival at said point during the succeeding rotation being equal to the time interval which would be required to make a complete rotation at said constant speed.

12. In a machine for forming glass articles, the combination of a blank mold carriage and a finishing mold carriage arranged side by side, means for rotating said carriages continuously at a constant speed about vertical axes, a blank mold and a finishing mold mounted respectively for rotation with said carriages and periodically brought simultaneously to a transfer station between the axes of said carriages, means to advance each of said molds relative to its carriage through a predetermined distance during each complete rotation, means for arresting the molds at the transfer station, and means for transferring a parison from the blank mold to the finishing mold at said station, the time interval during which the molds are arrested at the transfer station being such that the molds make one complete rotation about said axes during each complete rotation of the mold carriages.

13. In a machine for forming glass articles, the combination of a blank mold carriage and a finishing mold carriage arranged side by side, means for rotating said carriages about vertical axes, a blank mold rotatable with the blank mold carriage, a finishing mold rotatable with the finishing mold carriage, said molds arranged to be brought simultaneously to a transfer station, and means for arresting the molds at said station and holding them against forward movement with the mold carriages for a predetermined period of time while the mold carriages continue their rotation and then causing them to resume their rotation with the mold carriages.

Signed at Hartford, Connecticut, this 10th day of May, 1929.

SIDNEY F. PARHAM.